(12) United States Patent
Michalke et al.

(10) Patent No.: US 11,066,278 B2
(45) Date of Patent: Jul. 20, 2021

(54) CONVEYANCE ELEMENT FOR A CONVEYOR

(71) Applicant: Otis Elevator Company, Farmington, CT (US)

(72) Inventors: Martin Michalke, Brunn am Gebirge (AT); Bernhard Klutz, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/728,545

(22) Filed: Dec. 27, 2019

(65) Prior Publication Data

US 2020/0377342 A1 Dec. 3, 2020

(30) Foreign Application Priority Data

Jun. 3, 2019 (EP) .................................. 19177868

(51) Int. Cl.
| | |
|---|---|
| *B65G 21/10* | (2006.01) |
| *B66B 23/10* | (2006.01) |
| *B66B 21/10* | (2006.01) |
| *B23K 26/00* | (2014.01) |

(52) U.S. Cl.
CPC .............. *B66B 23/10* (2013.01); *B66B 21/10* (2013.01); *B23K 26/00* (2013.01)

(58) Field of Classification Search
CPC ......... B66B 21/10; B66B 21/12; B66B 23/08; B66B 23/10
USPC ........................................ 198/327, 329, 333
See application file for complete search history.

(56) References Cited

U.S. PATENT DOCUMENTS

| | | | | | |
|---|---|---|---|---|---|
| 4,330,057 A | * | 5/1982 | Binns | ...................... | B66B 23/10 198/334 |
| 5,072,821 A | * | 12/1991 | Kruse | ..................... | F16C 33/04 198/327 |
| 6,085,891 A | * | 7/2000 | Behle | ...................... | B66B 23/10 198/333 |
| 6,398,003 B1 | * | 6/2002 | Jasinetzky | .............. | B66B 23/12 198/333 |
| 6,405,848 B1 | * | 6/2002 | Babler | .................... | B66B 23/10 198/333 |
| 7,232,028 B2 | * | 6/2007 | Schulz | .................. | B66B 31/003 198/321 |

(Continued)

FOREIGN PATENT DOCUMENTS

| | | |
|---|---|---|
| DE | 102006023920 A1 | 11/2007 |
| DE | 102012110764 A1 | 5/2013 |

(Continued)

OTHER PUBLICATIONS

European Search Report for application EP 19160328.1, dated Nov. 20, 2019, 7 pages.

(Continued)

*Primary Examiner* — Joseph A Dillon, Jr.
(74) *Attorney, Agent, or Firm* — Cantor Colburn LLP (57) ABSTRACT

A conveyance element (20) for a conveyor (1), in particular for a people conveyor such as a moving walkway (2), is configured for being moved in a conveying direction and comprises an outer side (20a) configured for accommodating and supporting passengers; and an opposing inner side (20b) facing away from the outer side (20a). At least a portion of the inner side (20b) is a concave portion (32) having a concave shape along the conveying direction.

10 Claims, 6 Drawing Sheets

(56) References Cited

U.S. PATENT DOCUMENTS

| | | | |
|---|---|---|---|
| 7,604,108 B2* | 10/2009 | Gonzalez Alemany | B66B 23/02 198/325 |
| 9,617,122 B2* | 4/2017 | Matheisl | B66B 21/02 |
| 9,718,647 B2* | 8/2017 | Makovec | B66B 21/10 |
| 2003/0015378 A1 | 1/2003 | Elsener | |
| 2009/0139830 A1 | 6/2009 | Alemany et al. | |
| 2014/0231182 A1 | 8/2014 | Paasisalo | |
| 2015/0314991 A1 | 11/2015 | Trottman | |
| 2016/0176681 A1* | 6/2016 | Makovec | B66B 23/10 198/321 |
| 2019/0218070 A1* | 7/2019 | Illedits | B66B 23/145 |
| 2020/0087117 A1* | 3/2020 | Turek | B66B 31/00 |
| 2020/0198935 A1* | 6/2020 | Viita-Aho | B66B 29/00 |
| 2020/0231409 A1* | 7/2020 | Illedits | B66B 7/062 |
| 2020/0377341 A1* | 12/2020 | Illedits | B66B 23/10 |

FOREIGN PATENT DOCUMENTS

| | | |
|---|---|---|
| EP | 2058264 A1 | 5/2009 |
| EP | 2341028 A1 | 7/2011 |
| WO | 2019048306 A1 | 3/2019 |

OTHER PUBLICATIONS

European Search Report for Application No. 19177868.7; dated Nov. 29, 2019; 8 Pages.

* cited by examiner

CONVEYANCE ELEMENT FOR A CONVEYOR

FOREIGN PRIORITY

This application claims priority to European Patent Application No. 19177868, filed Jun. 3, 2019, and all the benefits accruing therefrom under 35 U.S.C. § 119, the contents of which in its entirety are herein incorporated by reference.

BACKGROUND

The invention relates to a conveyance element for a conveyor, in particular for a people conveyor such as a moving walkway. The invention also relates to a conveyor comprising such a conveyance element, and to a method of manufacturing such conveyance elements.

A (people) conveyor, such as a moving walkway, usually comprises a plurality of conveyance elements, e.g. pallets, forming an endless conveyance band extending in a closed loop between two opposing turnaround portions. Considerable space is needed for guiding the conveyance elements around the turnaround portions.

It would be beneficial to reduce the space which is necessary for the turnaround portions in order to reduce the construction size, in particular the height, of the conveyor.

SUMMARY

According to an exemplary embodiment of the invention, a conveyance element for a conveyor, in particular for a people conveyor such as a moving walkway, is configured for being moved in a conveying direction. The conveyance element comprises an outer side, which is configured for accommodating and supporting passengers, and an opposing inner side facing away from the outer side. At least a portion of the inner side is a concave portion having a concave shape along the conveying direction.

In other words, at least a portion of the inner side of the conveyance element is bulged or arced towards the opposing outer side of the conveyance element. This configuration allows using the available space more efficiently by arranging the conveyance element closer to the axle in the turnaround portions. As a result, the space needed for the turnaround portions and in consequence the overall construction size, in particular the height, of the conveyor may be reduced.

Exemplary embodiments of the invention also include a conveyor, in particular a people conveyor such as a moving walkway, comprising a plurality of conveyance elements according to an exemplary embodiment of the invention and a tension element, in particular a conveying chain or a conveying belt, connected with the conveyance elements and configured for driving the conveyance elements.

In such a conveyor, the dimensions of the turnaround portions and thus the overall dimension of the conveyor may be reduced compared to conventional conveyors.

A number of optional features are set out in the following. These features may be realized in particular embodiments, alone or in combination with any of the other features.

The concave portion may have a rounded cross-section, in particular a cross-section having the shape of a partial circle. A rounded shape of the concave portion may be formed by appropriately bending a sheet material, in particular a steel or aluminum sheet material. A concave portion having a rounded cross-section is well-suited for, at least partly, accommodating a rotating axle, which usually has a circular cross-section.

The concave portion may have a polygonal cross-section, in particular a triangular cross-section. A polygonal cross-section may be produced easily, e.g. by bending a sheet material, in particular a steel or aluminum sheet material.

Alternatively, the body may be an extrusion profile, in particular an extrusion profile made of aluminum.

The conveyance element may comprise a body and a tread plate. The tread plate may be manufactured separately from and then attached to the body. In such a configuration, the concave portion is formed at the body. Manufacturing the body and the tread plate separately allows using different production methods and materials for manufacturing the body and the tread plate. Thus, optimized production methods and materials may be used for the body and the tread plate, respectively.

The body, for example, may be made of steel or a material comprising steel, and the tread plate may be made of aluminum or a material comprising aluminum, a synthetic material or steel sheet metal.

The body and/or the tread plate also may be made of a synthetic material, in particular a fiber reinforced synthetic material.

The body may comprise at least one metal sheet, in particular at least two metal sheets attached to each other. The at least one metal sheet may be bent. The at least two metal sheets may be attached to each other by means of bolts, screws, rivets, soldering, welding and/or an appropriate adhesive material.

By combining at least two metal sheets, a body with a cross-section having a closed shape may be formed.

The body may be formed as an extruded metal profile, for example an extruded aluminum profile or an extruded profile made of a synthetic material.

The body may comprise a cavity surrounded by walls and the thickness of the walls may vary along their respective extensions. Varying the thickness of the walls allows adjusting the thickness of the walls, or portions of the walls, to the respective static requirements. A body comprising walls with varying thicknesses may be produced easily by forming the body as an extrusion profile.

For example, the body may comprise corners or edges joining at least two adjacent walls. The thickness of the walls at the corners or edges may be larger than the thickness of portions of the walls spaced apart from the corners or edges.

The aim is to arrange the material as far as possible from the center of gravity seen from the rectangular passenger load direction upon the tread plate. This is close to the tread plate and close to the outmost areas of the circular or triangular bottom of the pallet. In the embodiments shown in the figures, those areas are located at the corners or edges of the body.

The conveyance element may comprise at least one cut-out configured for accommodating a tension element, in particular a conveying chain or a conveying belt, passing by or through the conveyance element.

Exemplary embodiments may further include a method of manufacturing conveyance elements for a conveyor, in particular a people conveyor such as a moving walkway. The method comprises forming an extrusion profile by extruding a material through a die and cutting the extrusion profile into a plurality of pieces (sections), each of the pieces constituting a body of a conveyance element.

The method may include forming the conveyance element with an outer side configured for accommodating and supporting passengers and an opposing inner side facing away from the outer side; wherein at least a portion of the inner side is a concave portion having a concave shape along the conveying direction. The inner side of the conveyance element may be formed by the body. A body having a concave portion may be formed easily by extrusion employing an appropriate die.

The extrusion profile may be cut, e.g. by means of an appropriate saw, into sections having the desired lengths. By varying the lengths of the sections, bodies for producing conveyance elements having different widths may be produced from the same extrusion profile.

Forming the body by extrusion allows forming the walls of the body easily in a desired shape. It in particular allows conveniently varying the thickness of the walls along a cross-section of the extrusion profile.

The method may include cutting, in particular laser-cutting, at least one cut-out, which may be configured for accommodating a tension element, into each of the bodies.

The method may further include forming or attaching a tread plate, which has been produced separately, at/to an outer side of the body.

DRAWING DESCRIPTION

In the following exemplary embodiments of the invention are described with reference to the enclosed figures.

DETAILED DESCRIPTION

Figure 1:
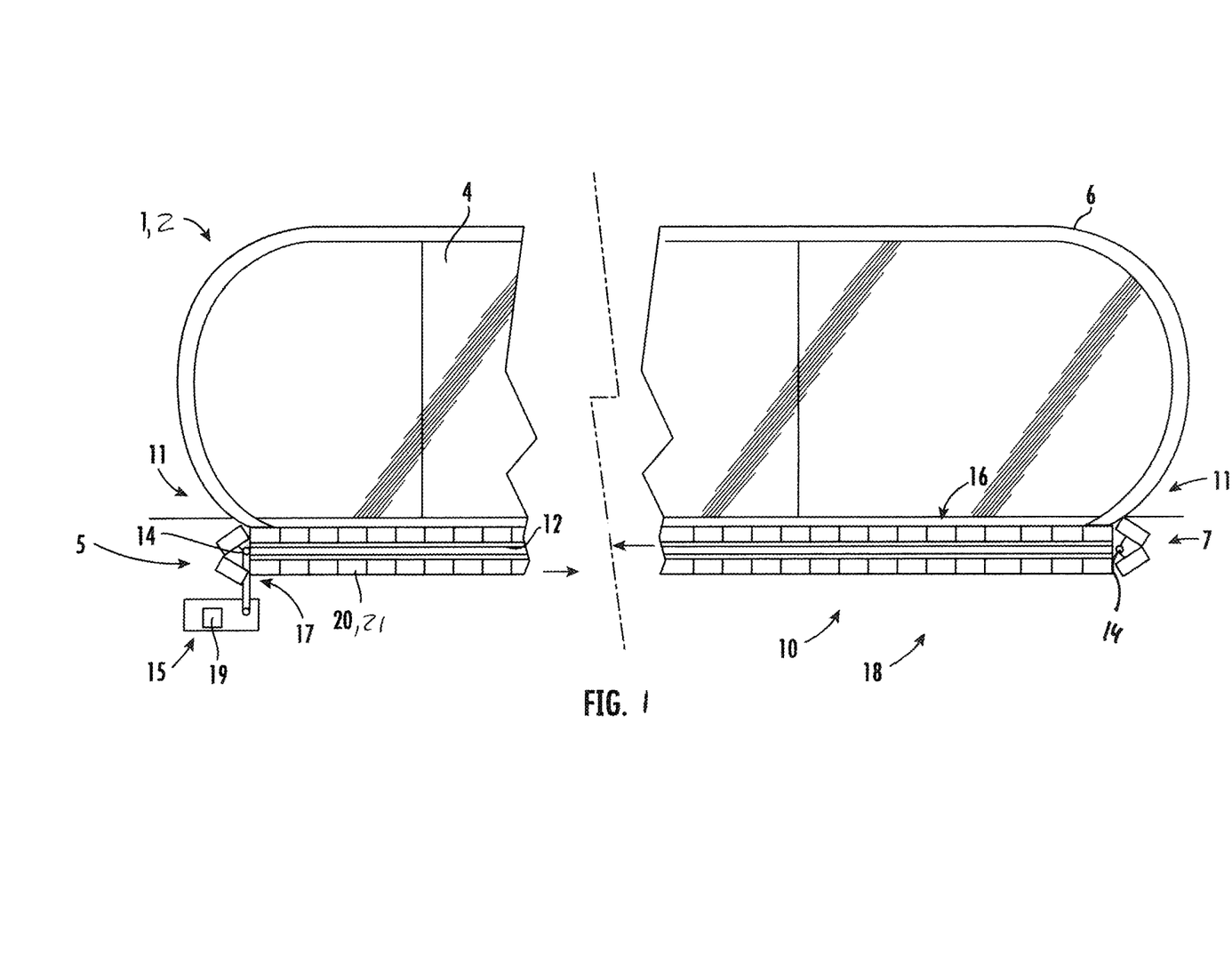
FIG. 1 depicts a schematic side view of a conveyor, in particular of a people conveyor such as a moving walkway.

FIG. 1 depicts a schematic side view of a conveyor 1, in particular a people conveyor such as a moving walkway 2.

The conveyor 1 comprises an endless conveyance band 10 including conveyance elements 20, in particular pallets 21, moving between two landing portions 11 provided at opposite ends of the conveyor 1. The conveyance elements 20 move along a conveyance direction in an upper conveyance portion 16 and opposite to the conveyance direction in a lower return portion 18. Turnaround portions 5, 7, are provided at both ends of the conveyor 1 next to the landing portions 11. In one of the turnaround portions 5, 7, the conveyance elements 20 pass from the conveyance portion 16 into the return portion 18. In the other one of the turnaround portions 5, 7, the conveyance elements 20 pass from the return portion 18 into the conveyance portion 16.

The conveyance elements 20 are connected to a tension element 12, such as a drive chain or belt, extending along a closed loop and configured for driving the conveyance elements 20. The tension element 12 extends around and is driven by a sprocket or sheave 14. A drive 15 including a motor 19 is provided for driving the sprocket or sheave 14 via a transmission element 17, e.g. a transmission belt or a transmission chain.

Balustrades 4 supporting moving handrails 6 extend parallel to the conveyance portion 16.

Figure 2:
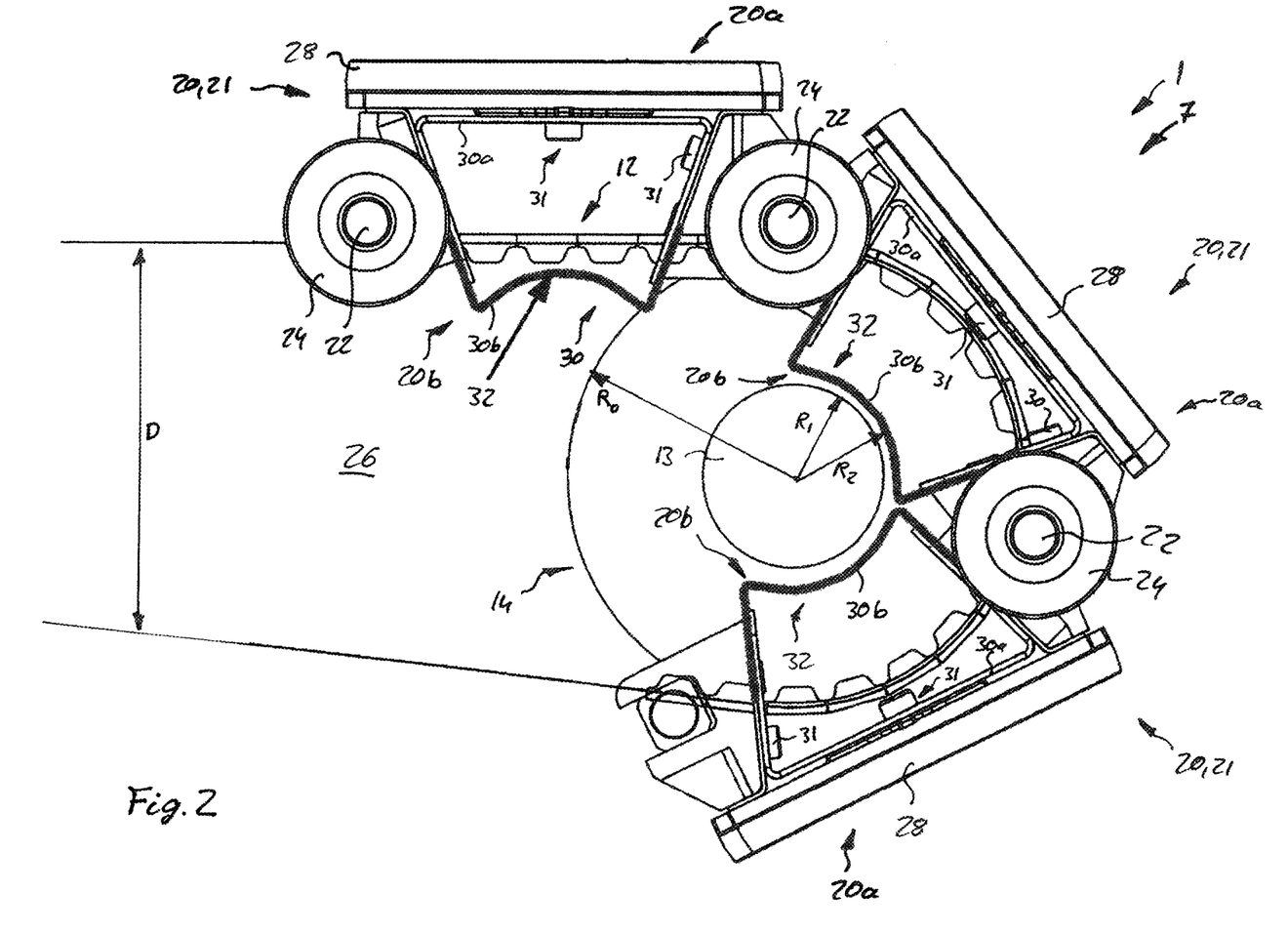
FIG. 2 depicts a side view of a turnaround portion of a people conveyor according to an exemplary embodiment of the invention.

FIG. 2 depicts a side view of a turnaround portion 7 of a conveyor 1 according to an exemplary embodiment of the invention.

FIG. 2 in particular depicts three of the plurality of conveyance elements 20 connected to the tension element 12. In the embodiment depicted in FIG. 2, the tension element 12 is a toothed belt. Exemplary embodiments of the invention, however, may include different kinds of tension elements, such as chains, as well.

The teeth of the toothed belt (tension element 12) engage with a toothed sheave 14 which is configured for guiding the tension element 12 from the (upper) conveyance portion 16 into the (lower) return portion 18 or vice versa. The teeth of the toothed sheave 14 are not depicted in the figures. The toothed sheave 14 may be driven by a drive 15 (cf. FIG. 1). A drive 15, however, needs to be provided only in one of the two turnaround portions 5, 7 (see FIG. 1). Thus, in one of the turnaround portions 5, 7, the toothed sheave 14 may be a free rotating sheave (idler sheave) 14 which does not drive the tension element 12, but which is driven by the tension element 12.

The sheave 14 is supported by a sheave axle 13 extending through the sheave 14. The sheave axle 13 may extend over the whole width of the conveyor 1 supporting a sheave 14 on each lateral side of the conveyor 1, respectively. In such a configuration, the conveyor 1 comprises two tension elements 12 extending parallel to each other.

Free rotating sheaves (idler sheaves) 14 may be rotatably supported by a not rotating (fixed) sheave axle 13. This configuration usually is employed when the conveyor 1 comprises two or more tension elements 12 extending parallel to each other. Alternatively, the idler sheave(s) 14 may be fixed to a sheave axle 13 which is configured to rotate freely together with the idler sheave(s) 14.

The conveyance elements 20 (pallets 21) are connected with each other and with the tension element 12 by conveyance element axles 22 extending orthogonally to the conveyance direction. Each of the conveyance element axles 22 supports at least one roller 24. Each of the conveyance element axles 22 in particular supports at least two rollers 24 including at least one roller 24 on each lateral side of the conveyance elements 20. The rollers 24 are supported and guided by guide rails (not shown) causing the conveyance elements 20 to move along a predefined movement path.

Each conveyance element 20 comprises an outer side 20a and opposing inner side 20b.

When a conveyance element 20 is located in the conveyance portion 16 of the conveyor 1, its outer side 20a faces upwards for accommodating and supporting loads and/or passengers (not shown) to be transported by the conveyor 1.

Since the conveyance elements 20 are rotated by approximately 180° when passing the turnaround portions 5, 7, the outer sides 20a face downwards, when the conveyance elements 20 are located in the return portion 18.

The inner sides 20b of the conveyance elements 20 face towards a space 26 formed between the conveyance portion 16 and the return portion 18.

A tread plate 28 is provided at the outer side 20a of each conveyance element 20. The tread plate 28 is supported by a body 30 of the conveyance element 20. The inner side 20b of the conveyance element 20 is formed by said body 30.

In the embodiment depicted in FIG. 2, the body 30 of the conveyance element 20 is formed by two appropriately bent metal sheets 30a, 30b. The metal sheets 30a, 30b are attached to each other by rivets, bolts and/or screws 31 such as to form a body 30 having a closed cross-section. The tread plates 28 are fixed to the body 30 by bolts and/or screws 31, too.

Alternatively or additionally to the rivets, bolts and/or screws 31, other fixing methods, such as adhesive bonding/gluing, welding or soldering, may be employed.

The body 30 may be made of a metallic material such as steel. When the body 30 comprises two or more sheets 30a, 30b, different sheets 30a, 30b may be made of different materials.

The tread plate 28 may be made of a metallic material, in particular of a material comprising aluminum. Alternatively or additionally, synthetic materials, in particular fiber reinforced synthetic materials, may be employed.

For reducing the weight of the body, the metal sheets 30a, 30b may comprise holes (not shown) forming a grid-like structure, which still provides the necessary rigidity and strength. This allows optimizing the relation between rigidity and weight.

For reducing the space needed for the turnaround portions 5, 7 of the conveyor 1, at least a portion of the inner side 20b of each conveyance element 20 is a concave portion 32, i.e. a portion having a concave shape along the conveyance direction parallel to the extension of the tension element 12. In other words, at least a portion 32 of the body 30 at the inner side 20b of each conveyance element 20 is bulged or arced towards the opposing outer side 20a of the conveyance element 20.

The concave portion 32 at the inner side 20b of each conveyance element 20 allows at least partially accommodating the sheave axle 13 when the respective conveyance element 20 is positioned in one of the turnaround portions 5, 7.

In consequence, the radius $R_O$ of the sheave 14 may be reduced and the conveyance elements 20 may be arranged closer to the sheave axle 13 in the turnaround portions 5, 7 compared to configurations in which the conveyance elements 20 do not comprise concave portions 32.

As a result, the space needed in the turnaround portions 5, 7, and in particular the vertical distance D between the conveyance portion 16 and the return portion 18, may be reduced.

In the embodiment depicted in FIG. 2, the concave portion 32 has an arcuate cross-section. The cross-section of the concave portion 32 in particular has the shape of a section of a circle (partial circle). Such an arcuate shape, in particular a shape of a partial circle having a radius $R_2$, which is slightly larger than the radius $R_1$ of the sheave axle 13, so that a small gap is formed between the outer peripheral surface of the axle and the curved inner side 20b of the conveyance element 20, allows the concave portion 32 to accommodate the sheave axle 13 very efficiently.

Figure 3:
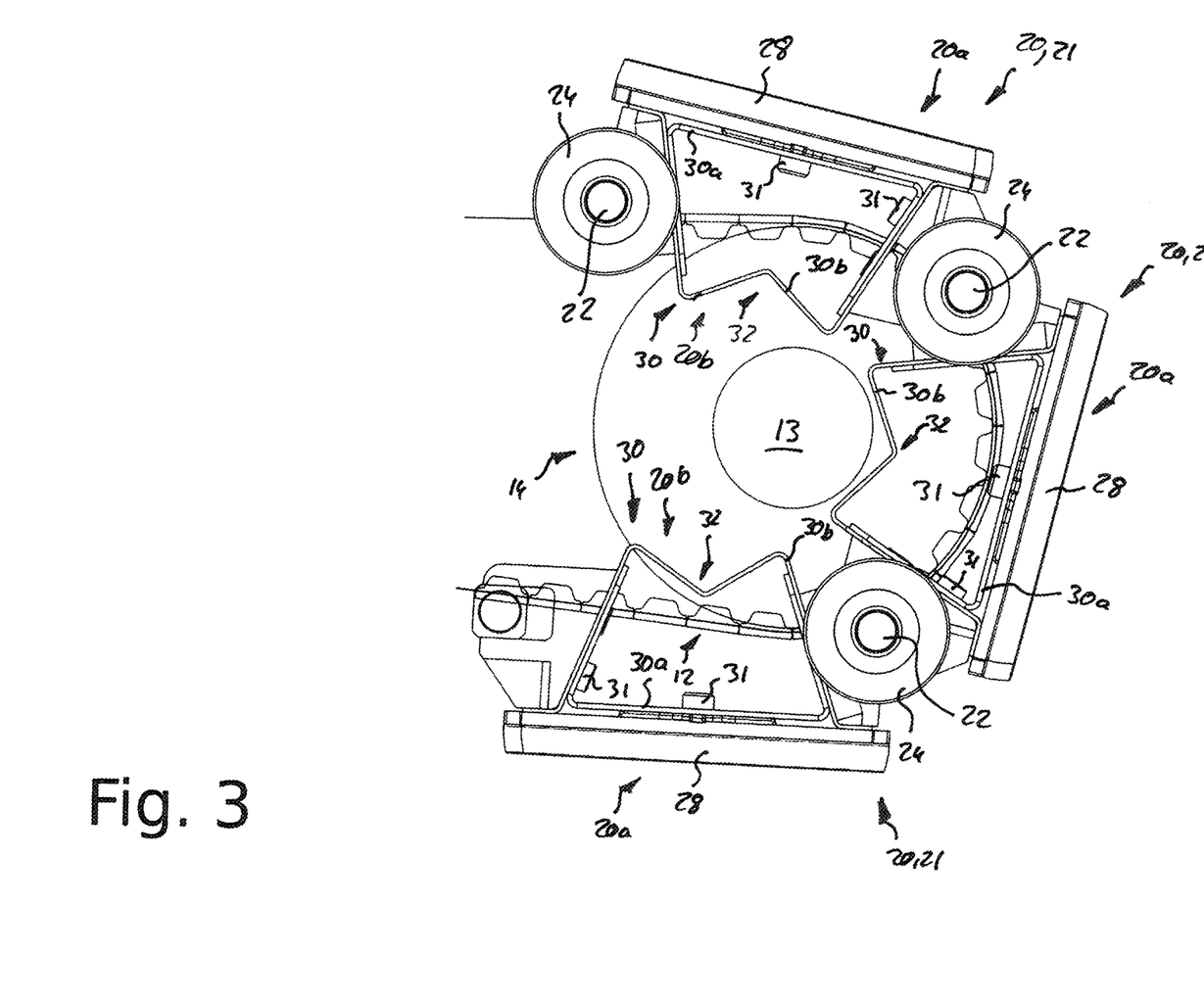
FIG. 3 depicts a side view of a turnaround portion of a people conveyor according to another exemplary embodiment of the invention.

In an alternative configuration, the concave portion 32 may have a polygonal cross-section, for example a triangular cross-section, as it is depicted in FIG. 3. A polygonal cross-section may be manufactured easily by appropriately bending a suitable sheet 30b.

Although only a curved shape and a triangular shape of the concave portions 32 are depicted in FIGS. 2 and 3, the skilled person understands that other polygonal shapes comprising more kinks than the triangular shape may be employed as well.

When the number of kinks is increased, the polygonal shape of the concave portion 32 converges towards the curved shape depicted in FIG. 2.

Figure 4:
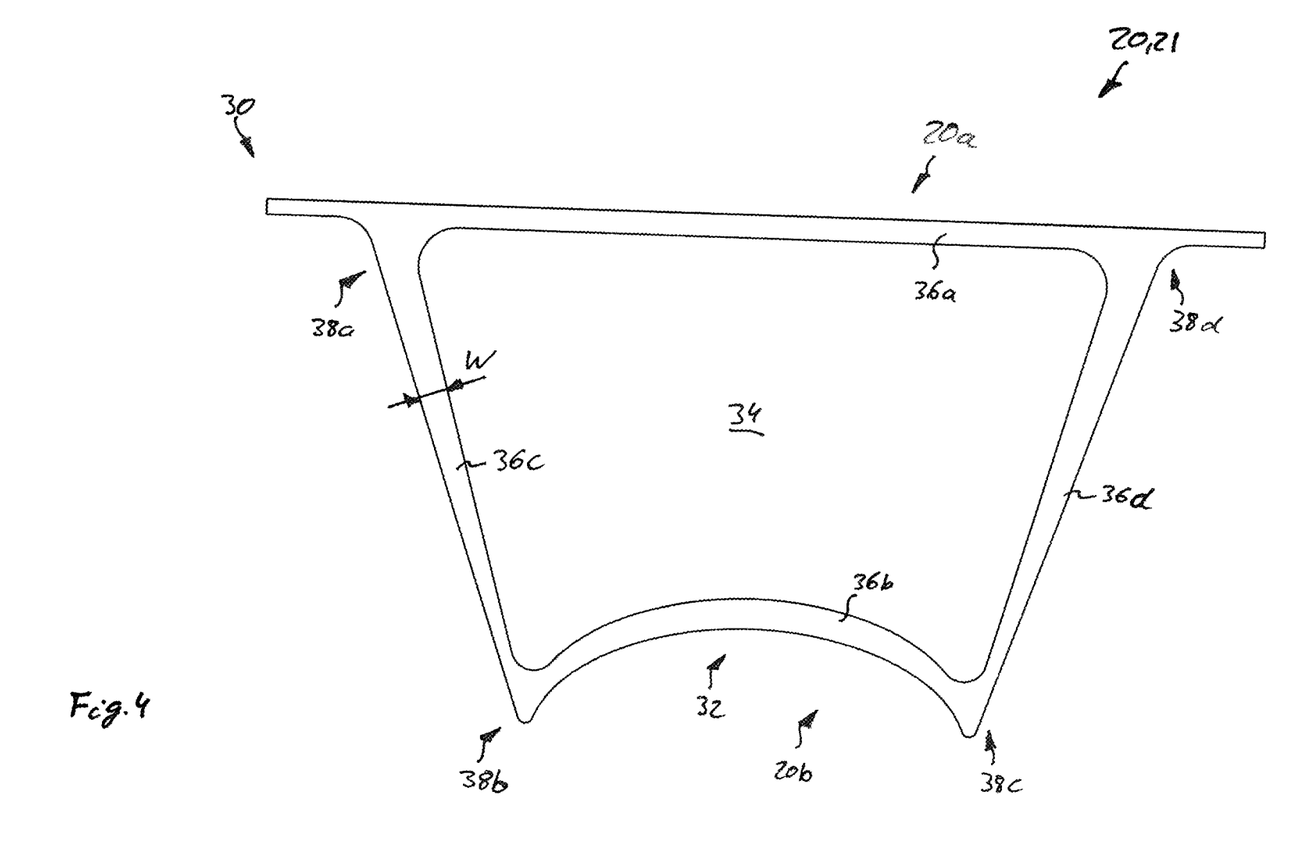
FIG. 4 depicts a sectional view of a body of a conveyance element of a people conveyor according to yet another exemplary embodiment of the invention.
Figure 5:
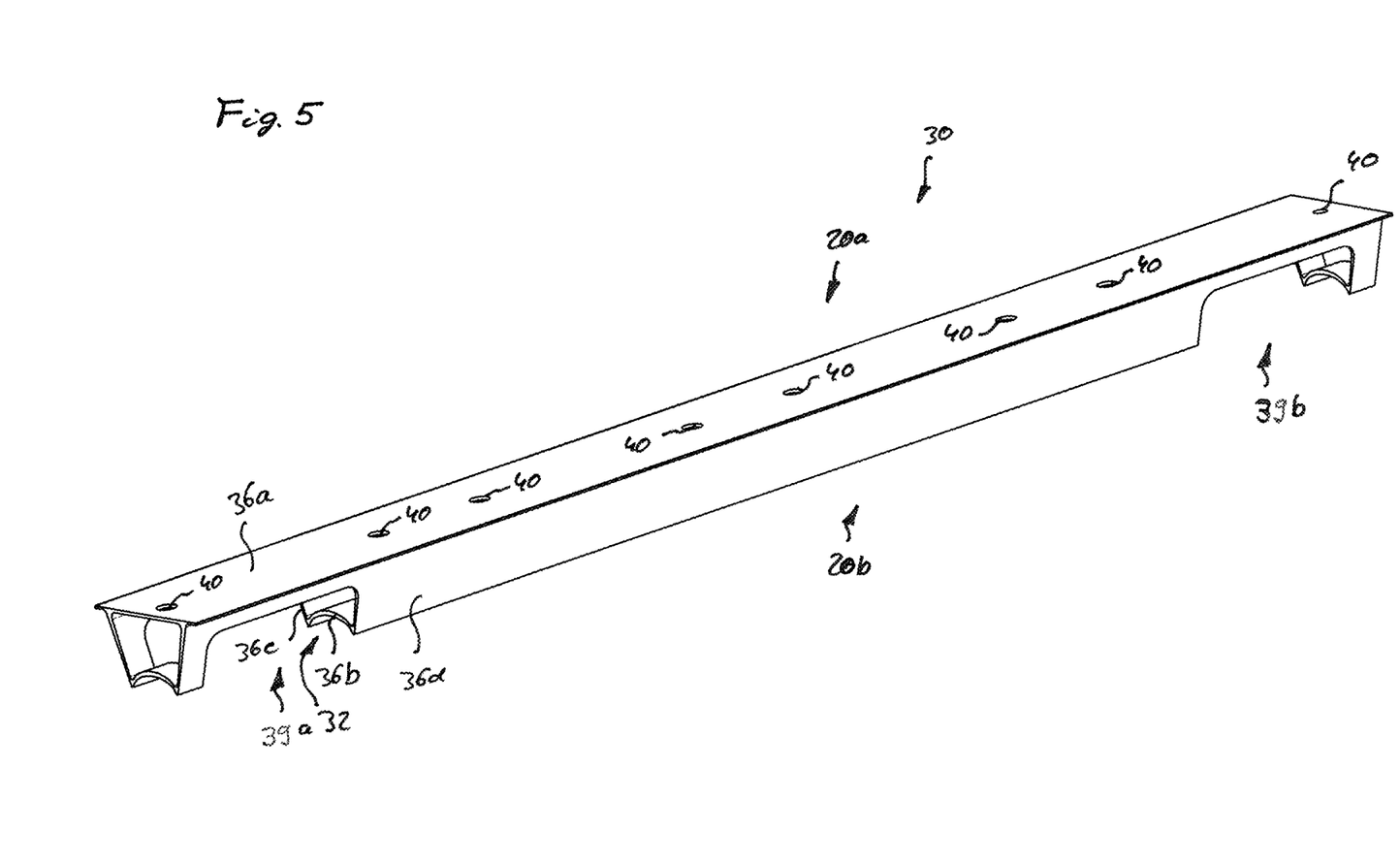
FIG. 5 depicts a first perspective view of the body depicted in FIG. 4.
Figure 6:
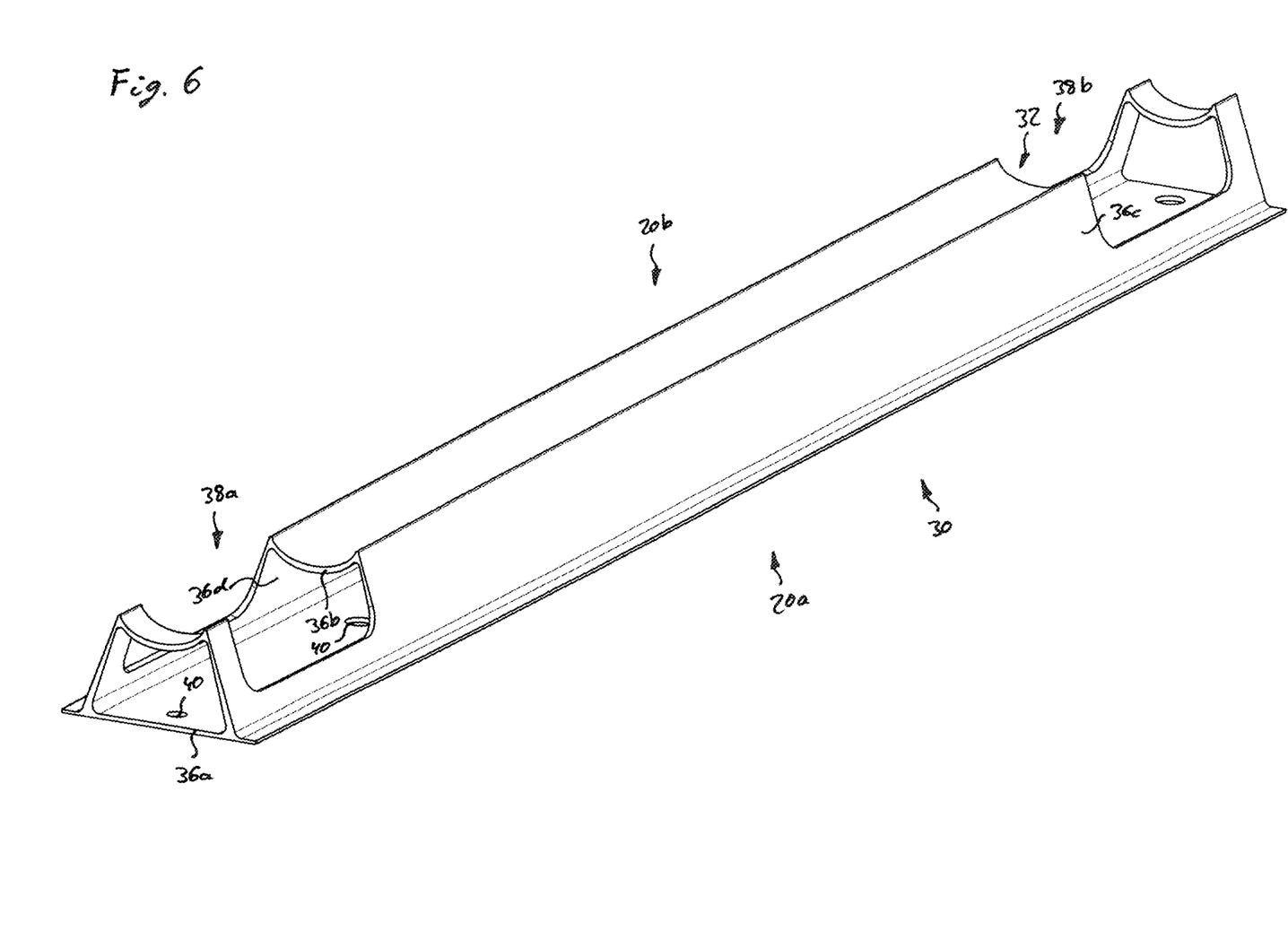
FIG. 6 depicts a second perspective view of the body depicted in FIGS. 4 and 5.

FIGS. 4 to 6 depict another embodiment of a body 30 of a conveyance element 20. FIG. 4 depicts a sectional view, and FIGS. 5 and 6 depict two different perspective views of the body 30 according to said embodiment.

Contrary to the embodiments depicted in FIGS. 2 and 3, the body 30 depicted in FIGS. 4 to 6 is not composed of at least two metal sheets 30a, 30b, but formed integrally, i.e. as a single piece.

The body 30 depicted in FIGS. 4 to 6 in particular may be formed from an extrusion profile, e.g. from an aluminum extrusion profile or from a synthetic extrusion profile. A synthetic extrusion profile may be reinforced by fibers.

In such a configuration, the extrusion profile is cut, e.g. by means of an appropriate saw, into sections forming pieces having the desired lengths. By varying the lengths of the pieces, bodies 30 for assembling conveyance elements 20 having different widths may be produced at low costs from the same the extrusion profile.

Cut-outs 39a, 39b (see FIGS. 5 and 6) configured for accommodating tension elements 12 (cf. FIG. 2) may be cut into the bodies 30, e.g. by laser-pipe cutting or by employing another suitable cutting method.

A tread plate 28 (not shown in FIGS. 4-6) may be formed integrally with the body 30. Alternatively, the tread plate 28 may be attached to the body 30, e.g. by bolts and/or screws 31 (cf. FIG. 2) extending through openings 40 (see FIGS. 5 and 6) formed within the body 30. Attaching a separately produced tread plate 28 to the body 30 allows using different production methods and materials for manufacturing the tread plate 28 and the body 30.

A body 30 as it is depicted in FIGS. 4 to 6 comprises a cavity 34 which is defined by an outer wall 36a at the outer side 20a, an at least partially concave inner wall 36b at the inner side 20b, and two sidewalls 36c, 36d extending between the outer wall 36a and the inner wall 36b, respectively.

Forming the body 30 by extrusion allows forming the walls 36a-36d easily in the desired shape. Employing extrusion for forming the body 30 in particular allows forming the inner wall 36b so that it has the shape of a partial circle, as depicted in FIG. 4; but it also allows forming the inner wall 36b polygonally, i.e. in a configuration similar to the embodiment depicted in FIG. 3.

Forming the body 30 by extrusion further allows varying the widths of the walls 36a-36d along their respective extensions. This allows arranging the material as far as possible from the center of gravity seen from the rectangular passenger load direction upon the tread plate 27. In the embodiment shown in the figures, the thickness W of the walls 36a-36d (see FIG. 4) are increased at the corners or edges 38a-38d of the body 30, i.e. at those parts of the body 30 at which at least two adjacent walls 36a-36d join, as shown in FIG. 4.

Varying the thickness W of the walls 36a-36d along their respective extension allows forming bodies 30 having the necessary rigidity and strength without using more material than necessary. As a result, the cost and the weight of the bodies 30 may be reduced.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 conveyor
2 moving walkway
4 balustrade
5 turnaround portion
6 handrail
7 turnaround portion
10 conveyance band
11 landing portion
12 tension element
13 sheave axle
14 sheave
15 drive
16 conveyance portion
17 transmission element
18 return portion
19 motor
20 conveyance element
20a outer side
20b inner side
21 pallet
22 conveyance element axle
24 roller
26 space between the conveyance portion and the return portion
28 tread plate
30 body
30a, 30b sheets
31 rivet, bolt or screw
32 concave portion
34 cavity
36a-36d walls
38a-38d corners or edges
39a, 39b cut-outs
40 opening
D vertical distance between the conveyance portion and the return portion
$R_0$ radius of the sheave
$R_1$ radius of the sheave axle
$R_2$ radius of the partial circle
W thickness of the walls

What is claimed is:

1. A conveyance element for a conveyor, the conveyance element being configured for being moved in a conveying direction and comprising:
    an outer side configured for accommodating and supporting passengers; and
    an opposing inner side facing away from the outer side;
    wherein at least a portion of the inner side is a concave portion having a concave shape along the conveying direction;
    wherein the concave portion has a polygonal cross-section.

2. The conveyance element according to claim 1, wherein the concave portion has a rounded cross-section.

3. The conveyance element according to claim 1 comprising a body and a tread plate attached to the body.

4. The conveyance element according to claim 3, wherein the body comprises steel and/or the tread plate comprises aluminum.

5. A conveyance element for a conveyor, the conveyance element being configured for being moved in a conveying direction and comprising:
    an outer side configured for accommodating and supporting passengers; and
    an opposing inner side facing away from the outer side
    wherein at least a portion of the inner side is a concave portion having a concave shape along the conveying direction;
    body and a tread plate attached to the body;
    wherein the body comprises at least one metal sheet.

6. The conveyance element according to claim 3, wherein the body comprises a metallic extrusion profile.

7. A conveyance element for a conveyor, the conveyance element being configured for being moved in a conveying direction and comprising:
    an outer side configured for accommodating and supporting passengers; and
    an opposing inner side facing away from the outer side
    wherein at least a portion of the inner side is a concave portion having a concave shape along the conveying direction;
    body and a tread plate attached to the body;
        wherein the body comprises a cavity surrounded by walls, and wherein the thickness of the walls varies along their respective extension.

8. The conveyance element according to claim 7, wherein the body comprises corners or edges joining at least two adjacent walls, respectively, and wherein the wall thickness at the corners or edges is larger than the thickness of portions of the walls spaced apart from the corners or edges.

9. A conveyance element for a conveyor, the conveyance element being configured for being moved in a conveying direction and comprising:
    an outer side configured for accommodating and supporting passengers; and
    an opposing inner side facing away from the outer side
    wherein at least a portion of the inner side is a concave portion having a concave shape along the conveying direction;
    body and a tread plate attached to the body;
    at least one cut-out configured for accommodating a tension element.

10. Conveyor comprising a plurality of conveyance elements according to claim 9 and a tension element connected to the conveyance elements and configured for driving the conveyance elements.

* * * * *